July 11, 1967 — H. W. DUNCAN — 3,330,060
MENSTRUAL CYCLE PROGRAMMING DEVICE
Filed Oct. 20, 1965 — 3 Sheets-Sheet 1

HOWARD W. DUNCAN
INVENTOR.

WHANN & McMANIGAL
BY Attorneys for Applicant

July 11, 1967

H. W. DUNCAN 3,330,060

MENSTRUAL CYCLE PROGRAMMING DEVICE

Filed Oct. 20, 1965

HOWARD W. DUNCAN
INVENTOR.
WHANN & McMANIGAL
BY Attorneys for Applicant

July 11, 1967     H. W. DUNCAN     3,330,060

MENSTRUAL CYCLE PROGRAMMING DEVICE

Filed Oct. 20, 1965     3 Sheets-Sheet 3

Fig. 7

HOWARD W. DUNCAN
INVENTOR.

WHANN & McMANIGAL
BY Attorneys for Applicant

United States Patent Office 3,330,060
Patented July 11, 1967

3,330,060
MENSTRUAL CYCLE PROGRAMMING DEVICE
Howard W. Duncan, 35230 Date St.,
Yucaipa, Calif. 92399
Filed Oct. 20, 1965, Ser. No. 498,947
11 Claims. (Cl. 40—107)

The present invention relates generally to visual recording and computing devices, and is more particularly concerned with a device for facilitating the determination and programming of female menstrual cycles It has heretofore been medically established that the menstrual cycle of women conforms in general to rather well-established recurring cyclic periods and times when conception is most apt to occur, and other periods and times, which may be designated as "safe" periods, when conception is not possible. As a consequence, the so-called "rhythm method" has been developed by which women can determine the time when they are most likely to conceive, and by proper planning and observance of this method are able to effectively control and obtain "planned parenthood," providing the method is diligently and accurately followed and is not used in a haphazard manner.

Based on the foregoing, available statistical information, research reports, and the consideration of certain variable factors, the device of the present invention is arranged to provide simple means for the recording, consideration and establishment of a planned program with respect to a woman's menstrual cycles.

A further object is to provide in a device of the character described, means for indicating certain pertinent factors of a plurality of past menstrual cycles together with other means for predicting and visually indicating the dates of occurrence of such factors in future cycles, as based on established trends and variations noted for the individual's past cycles.

A still further object is to provide a menstrual cycle planning device which takes into account variations in length of menstrual cycles as well as other factors, as established by extensive observations, whereby a predicted range of period lengths may be incorporated to include variations which extend or range from the shortest observed cycle to the longest observed cycle.

Further objects of the invention will be brought out in the following part of the specification, wherein detailed description is for the purpose of fully disclosing the invention without placing limitations thereon.

Referring to the accompanying drawings which are for illustrative purposes only:

FIG. 7 is a view in plan of the calendar scales carried by the rotatable drum of the casing.

Referring more specifically to the drawings, for illustrative purposes, the device of the present invention is shown as being incorporated within a housing structure which may be of molded plastic or fabricated from any other suitable material to provide a cabinet or case portion 10 and attached lid 11.

Figure 1:
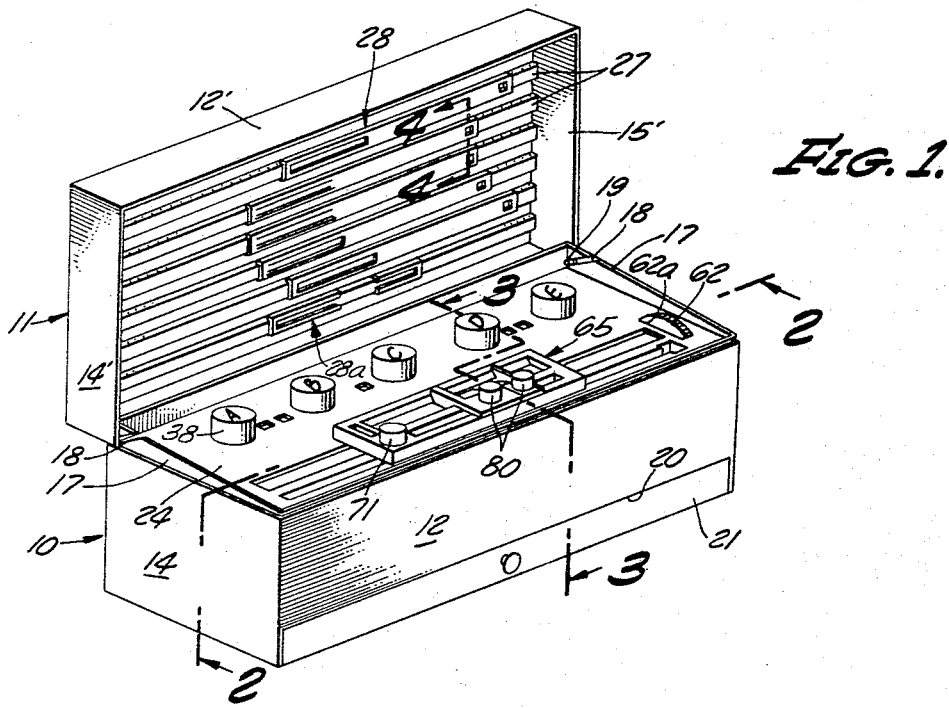
FIG. 1 is a perspective view of a device embodying the features of the present invention.

As shown in FIG. 1, the case is of substantially rectangular configuration, being formed with a front wall 12, rear wall 13 and connecting end walls 14 and 15. The lid 11 is correspondingly formed of similar configuration to that of the case and is fabricated to provide a top wall 16 together with front wall 12', rear wall 13' and end walls 14' and 15' which are arranged, in the closed position of the lid, to provide extensions of the walls of the case. The wall structure of the case is upwardly extended to include an inwardly offset peripheral flange 17 which makes a slip fit with the lid, when in closed position. This flange is also utilized for hinged mounting of the lid, and at the back of the case is provided with inclined slots 18—18 at the case ends which respectively receive hinge pins 19—19. When the lid is in a partially opened position, the hinge pins may be removed from the slots in order to disconnect the lid from the case, if desired.

Figure 2:
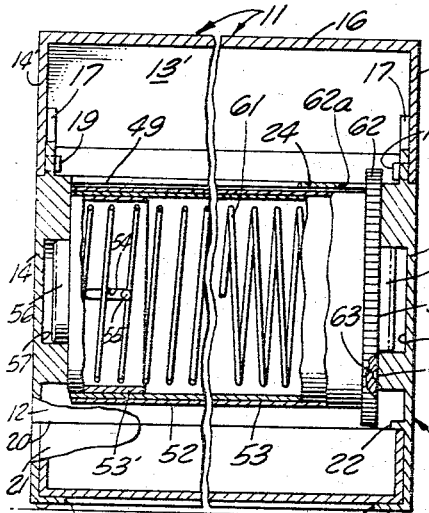
FIG. 2 is an enlarged fragmentary longitudinal section, taken substantially on line 2—2 of FIG. 1 to show certain features of construction.
Figure 3:
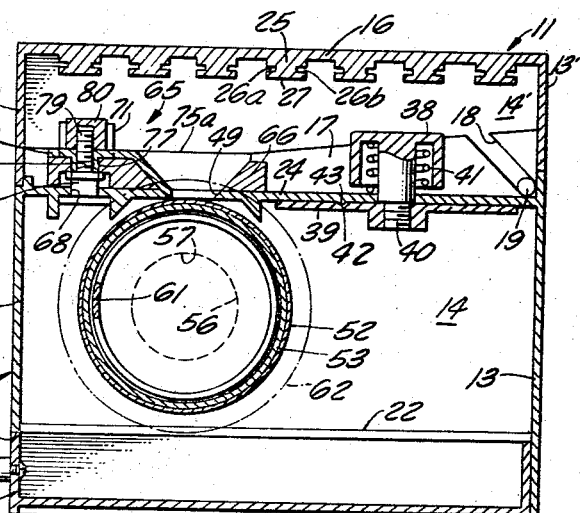
FIG. 3 is an enlarged transverse sectional view taken through the device with the casing lid in closed position, taken substantially on line 3—3 of FIG. 1.

As shown in FIGS. 2 and 3, the front wall 12 of the case is formed with an elongate opening 20 along its bottom margin for receiving a drawer member 21 which is slidably supported between spaced inwardly projecting guide flanges 22 and 23 which may be integrally formed with the associated end wall structures. This drawer provides storage space for sundry and various items which might be needed with respect to the utilization of the device of the present invention. It will be observed that when the drawer is removed from the case, the case bottom is of open construction and provides access to the interior of the case for the assembly of the instrumentalities, as will be described subsequently, which are carried by or associated with a supporting platform 24 arranged at the top of the case.

Figure 5:
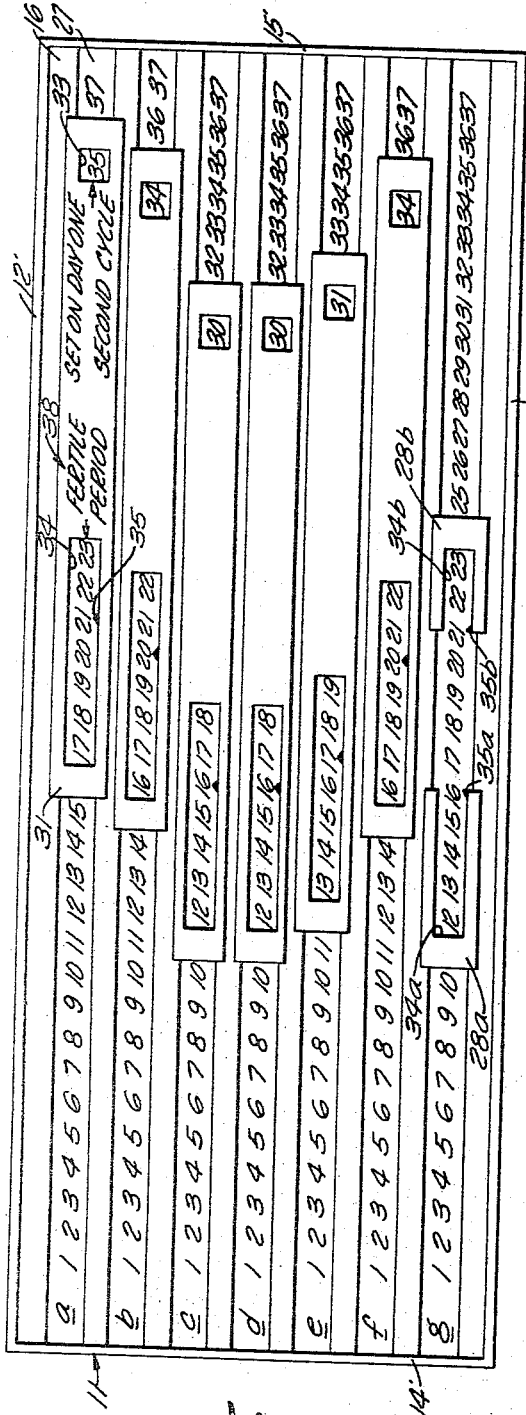
FIG. 5 is an enlarged face view of the casing lid showing the arrangement and relationship of the linear scales thereon.

As shown in FIGS. 1 and 5, the inner side of the top wall of the lid 11 carries a plurality of linear scales a to g inclusive which are of similar construction. These scales may be separately constructed and secured to the inner surface of the top wall of the lid, if desired. However, in the present arrangement, the scales comprise integrally formed T-rails 25 which are arranged in parallel spaced apart relation. Each rail is provided with opposed grooves 26a and 26b in its side walls and presents a scale bearing surface 27 which carries the numerals 1 to 37 which begin at the lowest numeral at the left end of the scale and terminate with the highest numeral at the right end of the scale (FIG. 5). Each of the linear scales a to g represents a menstrual cycle, and the numerals of each scale constitute the respective days in the menstrual cycle beginning with numeral 1 which is the first day of "bleeding."

Figure 4:
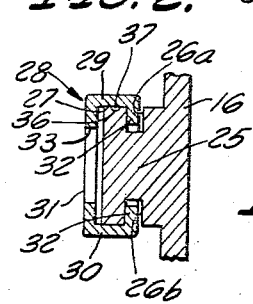
FIG. 4 is an enlarged transverse sectional view showing features of construction of linear scales as carried by the lid of the device, taken substantially on line 4—4 of FIG. 1.

Each of the rails carries an elongate slide member 28 of generally U-shaped configuration having spaced sides 29 and 30 (FIG. 4) connected by a bridging portion 31, each of the sides having an inturned marginal flange 32 for sliding movement in the groove 26a or 26b as the case may be. The bridging portion 31 of the slide is provided adjacent one end with a window opening 33 of a size to expose a single numeral of the associated scale. This window bears the legend "set on day one second cycle." At the other end of the slide is a longer window opening 34 of sufficient length to expose a total of seven numerals of the scale, this window bearing the legend "fertile period." The latter window is provided with an index pointer 35 which is positioned at the fifth number from the left of the numbers appearing in this window. For example, in the scale a, the index pointer is on the numeral 21 which is 14 days in advance of the number appearing in the window 33. In order that the slide 28 may be held against inadvertent movement at each number position, one side of each rail is provided with a series of dimples or indentations 36 (FIG. 4), while the adjacent side of the slide member is provided with a complementary projection 37 adapted to releasably seat in the indentations as the slide is moved from one numeral to the other.

The interrelationship of the windows 33 and 34 with respect to the index pointer 35 is based upon the established average period of the menstrual cycle, and the observation that the approximate day of ovulation, as indicated by the index pointer 35 will occur 14 days preceding the second cycle day, and that there is a possibility of conception within a seven day period which includes the four days preceding the day of ovulation and two days following the day of ovulation. The scales *a* to *f* inclusive provide recording means whereby a visual record may be kept of six succeeding menstrual cycles for the purpose of establishing any change from normalcy which would indicate whether during the observed time there had occurred a shorter or longer cycle which should be taken into consideration in determining the probable fertile period of the individual.

The scale *g* is provided with a slightly different type wherein the slide 28, with respect to the portion containing the window 34 is constructed with separable sections 28*a*, and 28*b* having cooperable window portions 34*a* and 34*b*, the index pointer in this case being split to carry one portion 35*a* on one section and the other portion 35*b* on the other section. It will be observed that with the sections in end to end abutment, the index pointers 35*a* and 35*b* will both point to the same numeral to indicate a single day of ovulation, and a probable fertile period of seven days the same as in the case of the slide members 28. However, should the observed menstrual cycles as set up on the scales *a* to *f* indicate a variation in which there appears an earlier day of ovulation and a later day of ovulation, then this variance is taken into account to establish a probable fertile period of increased length. For example, if the recorded menstrual cycles show an earliest day as 16, the index pointer 35*a* would be set on this number, while the index pointer 35*b* would be set on the latest day of ovulation, in this case on the number 21. Thus instead of indicating a probable normal fertile period of 7 days, the probable fertile period would now be extended to cover a period of 12 days which should be used by this individual.

Figure 6:
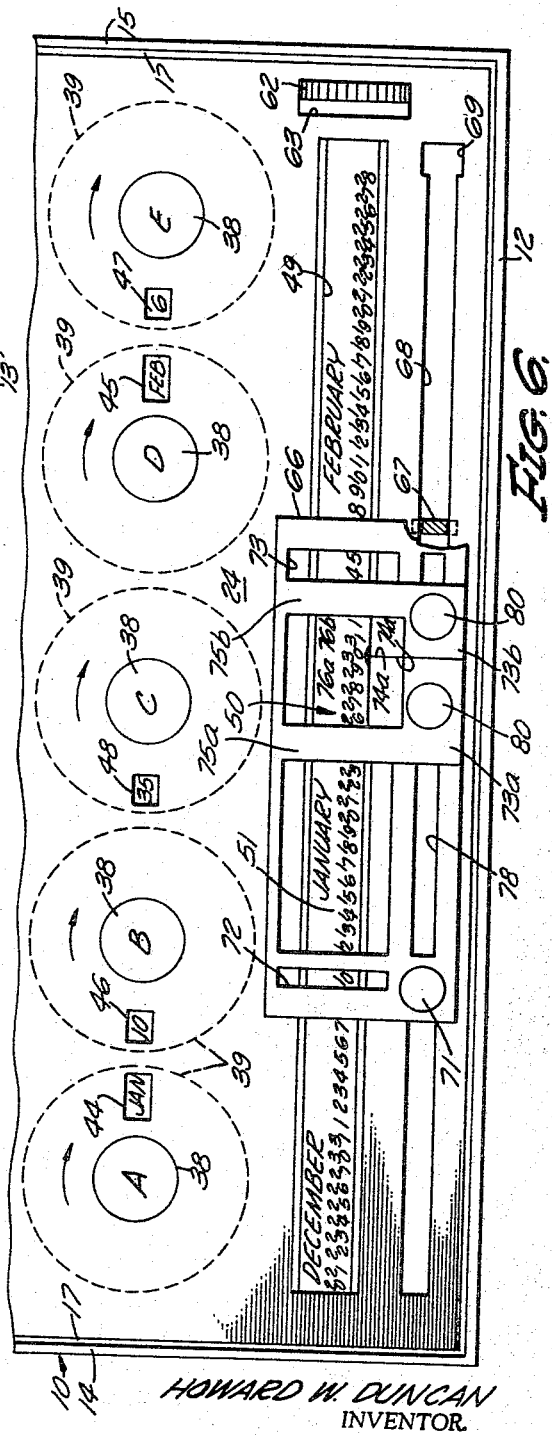
FIG. 6 is an enlarged fragmentary plan view showing the dial and scale arrangements carried by the casing of the device.

As best shown in FIG. 6, the upper part of the platform 24 is provided with a series of dialing knobs 38 which carry the indicating letters A to E inclusive, and are respectively connected with dial disc members 39. As shown in FIG. 3, each disc is centrally apertured and threaded to connectingly receive a threaded end of a stem 40 which is secured or integrally formed with the dialing knob 38 which is of cupped construction with the stem projecting therefrom. As mounted in FIG. 3, the knob is positioned above the platform 24, while the disc 39 is positioned below the platform, the stem extending through a suitable opening in the platform. A compression spring 41 surrounds the stem within the cupped knob, one end of this spring bearing against the knob and the other end against the platform so as to normally urge the dial disc in an upward direction into frictional engagement with the under side of the platform. Dwell points are provided to releasably retain the dial disc in its dialing positions by providing circumferentially spaced indentations 42 which are arranged to receive companion projections 43 formed on the underside of the platform, as the dialing disc is rotated to its different dialing positions.

The dial disc members having knobs A and D are provided with indicia for indicating the respective calendar months of the year, the first of these dials having a display window 44 and the other a display window 45. The dials of the knobs B and E carry numerals from 0 to 31 which are viewable through windows 46 and 47 respectively. The dial of knob C carries numbers from 0 to 37 which are visible through a window 48.

Forwardly of the above described dials and positioned generally at the forward margin of the platform 24, the platform is provided with an elongate viewing slot or window 49 with respect to which provision is made for selectively displaying scales 50 having calendar designating numerals 51 thereon. As shown in FIG. 7, twelve calendar scales are provided upon a sheet of flexible material 52 arranged to be wrapped around the outer surface of a cylindrical drum 53 which is rotatably supported below the window 49 in a manner which will be explained shortly. It will be observed from the illustration in FIG. 7 that each of the scales 50 has a central portion which contains the day indicating numerals for the successive months. At the left end of each scale is an extension which includes the numerals of the latter part of the preceding month, while at the right end of each scale is an extension which includes the numerals of the first part of the succeeding month. As thus arranged, the menstrual cycle data with respect to a current month can be readily projected into the preceding or succeeding month with greater facility.

As shown in FIGS. 2 and 3, the drum 53 is closed at one end by means of a telescoped end member 53' which is slidable within the associated end of the drum within the limits of movement established by a slot 54 within which a pin 55 carried by the drum is moveable. The member 53' is formed with a central cylindrical projection 56 which is arranged to extend into and be rotatably supported within a recess 57 formed in the adjacent end wall 14. At the opposite end, the drum 53 is provided with an integrally formed fixed closure end wall 58 which is similarly provided with a central cylindrical projection 59 that is arranged to extend into a recess 60 in the end wall 15 and thus rotatably support this end of the drum. A compression spring 61 having one end bearing against the end wall 58 and its other end against the end member 53' normally urges the end member 53' axially to its extended limit. In order to mount or remove the drum from its supported position it is only necessary to push the end member 53' to its inner position, whereupon the drum is shortened sufficiently to permit insertion or removal of the projections with respect to their associated recesses. When so mounted, the outer surface of the drum having the scales 50 thereon will be proximate to the viewing window 49. Rotation of the drum is accomplished by means of an integrally formed projecting peripheral flange 62 which projects through an opening 62*a* formed in the platform 24. In order to provide dwell positions in the rotation of the drum at the points where a scale is visible through the viewing window 49, the end wall 58 is provided with circumferentially spaced indentations 63 which are adapted at the dwell points to receive companion projections 64 provided on the adjacent casing end wall.

Cooperatively associated with the viewing window 49 for use with the calendar scales displayed therein is a slide assembly as generally indicated at 65. This assembly comprises a main slide 66 of substantially rectangular shape which is supported for sliding guided movement along the viewing window 49. The slide body, which is of a suitable plate material, is provided at one end with an inverted T-projection 67 which is adapted to be placed into operative guided relation with an elongate slot 68 by insertion through an enlarged end open portion 69 of the slot. The opposite end of the main slide is guided in the slot 68 by the head end of a threaded screw 70 which extends upwardly through the slot and a suitable opening in the main slide so that the threaded end may be engaged by a cap nut 71. By loosening the cap nut 71, the main slide may be moved along the viewing window 49, a slot opening 72 being provided at the left end of the slide through which single numbers of the scale 50 are visible. A longer window or opening 73 is provided in the main slide through which a greater portion of the subtending scale is visible. A pair of secondary slides 73*a* and 73*b* are carried by the main slide for unitary movement therewith, yet are mounted on the main slide for relative adjustable positioning thereon. The secondary slides, as seen in FIG. 6, are in reversed relation, and each slide comprises a body portion 74a in the one case and 74b in the other, a projecting bar 75a and 75b respectively. The slides respectively have index pointers 76a and 76b.

Each secondary slide has a rib 77 on its under surface which extends into a guide slot 78 formed in the main slide 66. A screw 79 has its head portion positioned below the slot 78 and extends upwardly through the body portion of the slide member where it is engaged by a cap nut 80. With the cap nuts loosened, the secondary slides may be moved together or apart, and by tightening the cap nuts the secondary slides may be secured in fixed relation with respect to the main slide. When the secondary slides are moved together, the index pointers will point to a single number, and the facing edges of the bars 75a and 75b will define the ends of a window through which seven numerals will be visible so as to define the average fertile period in the same manner as in the case of one of the slide members 28. On the other hand, when a variance in the length of the fertile period becomes apparent, the secondary slides 73a and 73b are adjustable to compensate for the earliest date of ovulation and the latest date of ovulation in the same manner as the slides 28a and 28b as previously explained.

The manner of using the device will now be described briefly. Initially the individual begins to use the device by first noting the first day of bleeding in the menstrual cycle which is to be recorded. The calendar date of this first day of the cycle is recorded by turning the knob A to the month, for example, January. The calendar date is then registered by turning the knob B, which has been noted as the tenth. Each successive day is then recorded by moving the knob C clockwise until bleeding again occurs. The number showing in the window 48, in this case 35, will thus show the number of days of the first menstrual cycle. This number is now entered on the linear scale a by moving the slide 28 until the number 35 appears in the window opening 33. The window 34 now discloses when the fertile period existed for the recorded menstrual cycle and the ovulation day therein.

In order to show the predicted information for the future, the correct calendar scale for January is brought into view in the window 49. The main slide 66 is now initially positioned so that the number 1 will appear through the slot opening 72. Now the secondary slides 73a and 73b are adjusted so that the index pointers 76a and 76b will be brought together and indicate the day of ovulation as shown by the linear scale a, namely, the number 21. As thus adjusted, the secondary slides will indicate the same information as indicated in the window 34 of the linear scale a for the first menstrual cycle. It is now desirable to transfer this information into the corresponding calendar days of the current month which is January. This is done by now moving the main slide 66, leaving the secondary slides in their previously set positions, until the number 10, as indicated in the window 46 for knob B setting, appears in the main slide window 72. In terms of calendar days, it will now be seen that the index pointers 76a and 76b will point to the calendar day 30, and the fertile period as thus far determined would include January 26 to February 1 inclusive. The predicted month of the next cycle will be set by turning the knob D to February, and the knob E for the predicted first day of bleeding of the next menstrual cycle.

The foregoing procedure is repeated for six cycles and the information recorded upon the linear scales b to f inclusive in the manner explained. The importance of recording the six cycles is that it shows the individual whether the cycles are normal or whether there may be a variance. If there has been a variance shown by the readings of the six linear scales, then this is noted by setting the index pointer 35a of linear scale g at the first day of ovulation, in this case at the number 16. The index pointer 35b is set at the latest day of ovulation, in this case at the number 21. The fertile period is thus extended to take into account the noted variations. This variance is then transferred to the calendar scales by correspondingly resetting the secondary slide index pointers 76a and 76b.

While the purpose of the device as described above is primarily for the programming of an individual's menstrual cycle, it is also of value in that mothers may use the device for the teaching of their daughters without embarrassment by discussing the subject in terms of cycles and fertile period.

From the foregoing description and drawings, it will be clearly evident that the delineated objects of the invention will be accomplished.

Various modifications may suggest themselves to those skilled in the art without departing from the spirit of my invention, and, hence, I do not wish to be restricted to the specific forms shown or uses mentioned except to the extent indicated in the appended claims.

I claim:

1. A menstrual cycle programming device, comprising:
(a) means for showing past menstrual cycle information including:
a plurality of first scales, each scale having numbers successively indicating the days of a menstrual cycle,
a slide supported for relative movement along each of said scales, said slide having setting means for selectively locating the slide with respect to a scale number indicative of the day following the end of a menstrual cycle and indicating the fertile period and day of ovulation therein for that menstrual cycle; and
(b) means for showing predicted future fertile periods and day of ovulation therein, including:
a plurality of calendar scales selectively movable to a viewing position; and
slide means having indices for indicating on a selected calendar scale the probable fertile period and day of ovulation therein as noted on said linear scales.

2. A menstrual cycle programming device, comprising:
(a) means for showing past menstrual cycle information including:
a plurality of first scales, each scale having numbers successively indicating the days of a menstrual cycle,
a slide supported for relative movement along each of said scales, said slide having setting means for selectively locating the slide with respect to a scale number indicative of the day following the end of a menstrual cycle and indicating the fertile period and day of ovulation therein for that menstrual cycle; and
(b) means for showing predicted future fertile periods and day of ovulation therein, including:
a plurality of calendar scales selectively movable to a viewing postion, and
slide means having indices for indicating on a selected calendar scale the probable fertile period range based on the shortest menstrual cycle and the longest menstrual cycle noted on said first scales.

3. A menstrual cycle programming device, comprising:
(a) means for showing past menstrual cycle information including:
a plurality of linear scales, each scale having numbers successively indicating the days of a menstrual cycle,
a slide supported for relative movement with respect to each of said scales, said slide having setting means for selectively locating the slide with respect to a scale number indicative of the day following the end of a menstrual cycle and indicating the fertile period and day of ovulation therein for that menstrual cycle; and (b) means for showing predicted future fertile periods and days of ovulation therein, including:
   rotatable means having calendar scales selectively movable to a viewing window position, and
   slide means supported for movement along said window having indices for indicating on a selected calendar scale the probable fertile period range and day of ovulation therein as noted from said linear scales.

4. A menstrual cycle programming device, comprising:
   (a) means for visually tabulating information with respect to a plurality of successive past menstrual cycles including means for indicating the day following the end of each menstrual cycle and indicating the fertile period and day of ovulation therein for that menstrual cycle; and
   (b) means for showing predicted future fertile periods and day of ovulation therein, including an elongate rotatable drum having longitudinally arranged day indicating numerals on its outer surface, selectively movable to a viewing position for each calendar month, and slide means having indices for indicating with respect to the numerals for a selected month, the probable future fertile period days and day of ovulation therein as noted from said tabulated information.

5. A device according to claim 4 wherein the slide means comprises a composite assembly of a main slide member having a pair of relatively movable indicators supported therein, but being movable with the main slide as a unit.

6. In a menstrual cycle programming device:
   (a) a plurality of linear scales, each scale having numbers successively indicating the days of a menstrual cycle;
   (b) first slides respectively supported for movement along certain of said scales, said slides each having setting means for selectively locating the slide with respect to a scale number indicative of the day following the end of a menstrual cycle and indicating the fertile period and day of ovulation therein for that menstrual cycle; and
   (c) second slide means for one of said scales having indices for indicating the probable fertile period based on the shortest menstrual cycle and longest menstrual cycle as indicated by said first slides on said linear scales.

7. In a menstrual cycle programming device:
   (a) a linear scale having numbers successively indicating the days of a menstrual cycle; and
   (b) a slide supported for movement along said scale, said slide having means for selectively locating the slide with respect to a scale member indicative of the day following the end of a specific menstrual cycle, and other means for indicating the fertile period and day of ovulation for such specific menstrual cycle.

8. In a menstrual cycle programming device:
   (a) an elongate rotatable drum having longitudinally extending calendar scales on its outer surface selectively movable to a viewing position; and
   (b) movable slide means associated with the selected scale having indices for indicating the probable fertile period based on a previously observed shortest menstrual cycle and previously observed longest menstrual cycle.

9. A menstrual cycle programming device, comprising:
   (a) a case having a platform accessible through its top, said platform having an elongate slot therein;
   (b) a lid supported on said case for selective movements to opened and closed positions with respect to the top of said case, and in closed position overlying said platform;
   (c) means carried on the inside of said lid for visibly showing past menstrual cycle information when the lid is in opened position, said means including a plurality of linear scales respectively having numbers successively indicating the days of a menstrual cycle;
   (d) a slide supported for movement along each of said scales, said slide having setting means for selectively locating the slide with respect to a scale number indicative of the day following the end of a menstrual cycle and indicating the fertile period and day of ovulation therein for that menstrual cycle;
   (e) means carried by said platform for showing predicted future fertile periods and day of ovulation therein, including a drum rotatably supported below said platform slot;
   (f) calendar bearing indicia scales on the outer surface of said drum selectively movable to a viewing position through said slot; and
   (g) slide means movable along said slot having indices for indicating on a selected calendar scale the probable fertile period based on the shortest menstrual cycle and longest menstrual cycle noted on said linear scales.

10. A menstrual cycle programming device, comprising:
    (a) a case having a platform accessible through its top, said platform having an elongate slot therein;
    (b) a lid supported on said case for selective movements to opened and closed positions with respect to the top of said case, and in closed position overlying said platform;
    (c) means carried by said platform for showing predicted future fertile periods and day of ovulation therein, including a drum rotatably supported below said platform slot;
    (d) calender bearing indicia scales on the outer surface of said drum selectively movable to a viewing position through said slot; and
    (e) slide means movable along said slot having indices for indicating on a selected calendar scale the fertile period based on a previously observed shortest menstrual cycle and a previously observed longest menstrual cycle.

11. A menstrual cycle programming device, comprising:
    (a) a case having a platform accessible through its top, said platform having in the front portion thereof an elongate slot;
    (b) a lid supported on said case for selective movements to opened and closed positions with respect to the top of said case, and in closed position overlying said platform;
    (c) a plurality of month and number indicating settable dials in the back portion of said platform;
    (d) means carried by said platform for showing predicted future fertile periods and day of ovulation therein, including a drum rotatably supported below said platform slot;
    (e) calendar bearing indicia scales on the outer surface of said drum selectively movable to a viewing position through said slot; and
    (f) slide means movable along said slot having indices for indicating on a selected calendar scale the probable fertile period based on the shortest menstrual cycle and longest menstrual cycle noted on said linear scales.

References Cited
UNITED STATES PATENTS

| | | | |
|---|---|---|---|
| 2,190,640 | 2/1940 | Araujo | 20—113 |
| 2,812,603 | 11/1957 | Telsey | 40—107 |
| 2,868,293 | 1/1959 | Kearse | 40—107 X |
| 3,190,022 | 6/1965 | Maitre | 40—113 |

EUGENE R. CAPOZIO, *Primary Examiner.*

W. J. CONTRERAS, *Assistant Examiner.*